Figure 1:
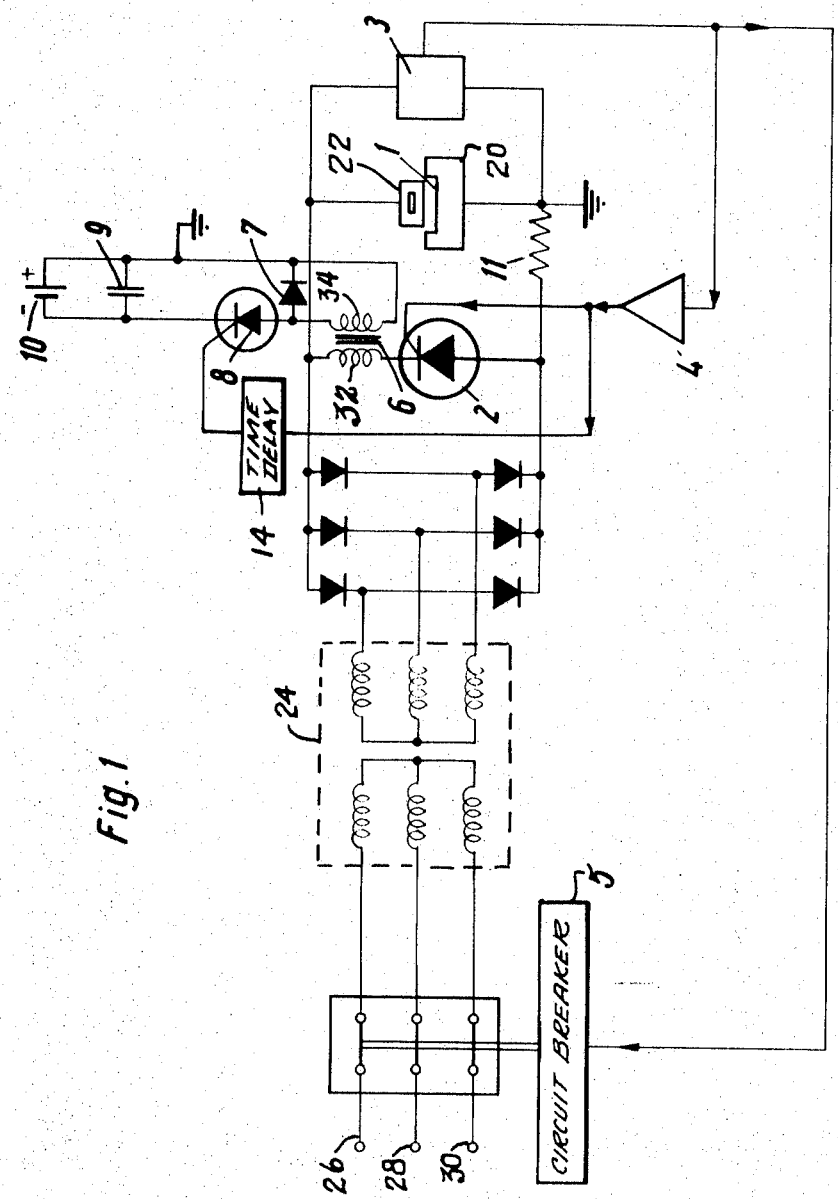

United States Patent

[11] 3,617,680

[72] Inventor Rudolf E. Grosskopf
  Aalen, Germany
[21] Appl. No. 884,805
[22] Filed Dec. 15, 1969
[45] Patented Nov. 2, 1971
[73] Assignee AEG-Elotherm GmbH
  Remscheid-Hasten, Germany
[32] Priority Dec. 24, 1968
[33] Germany
[31] P 18 16 865.5

[54] PROCESS AND CIRCUIT ARRANGEMENT FOR THE SWITCHING OF SHORT CIRCUITS OF INSTALLATIONS FOR THE ELECTROCHEMICAL REMOVAL OF MATERIAL
11 Claims, 2 Drawing Figs.

[52] U.S. Cl. .................................................. 219/69 S, 219/69 C
[51] Int. Cl. ............................................................ B23k 9/16
[50] Field of Search ............................................ 219/69 C, 69 S, 69 P; 204/143 T

[56] References Cited
UNITED STATES PATENTS
3,485,988 12/1969 Sennowitz .................. 219/69
3,485,989 12/1969 Sennowitz .................. 219/69

Primary Examiner—J. V. Truhe
Assistant Examiner—G. R. Peterson
Attorney—Cushman, Darby & Cushman ABSTRACT: A method and apparatus for accelerating the deflection of current from a working gap for electrochemical machining whereby, when a short circuit is detected, a current is produced in the gap opposing the short circuit current. Preferably, one or more thyristors are provided in parallel with the gap to shunt current away from the gap when a short circuit is detected and each has the secondary winding of a transformer connected to it. The primary winding of the transformer is connected to a charged capacitor which discharges through the primary winding, when a thyristor also connected in series with the capacitor is switched to a low-resistance state upon detection of the short circuit, so that a voltage is induced in the secondary winding which produces a current in the gap opposing the short circuit current.

PROCESS AND CIRCUIT ARRANGEMENT FOR THE SWITCHING OF SHORT CIRCUITS OF INSTALLATIONS FOR THE ELECTROCHEMICAL REMOVAL OF MATERIAL

This invention relates to a method of protecting and circuit means for the protection of apparatus which electrochemically machine metal workpieces from excessive electrical currents which result when the working gap is short circuited.

In electrochemical machining and deburring, a workpiece is conventionally connected to a source of direct current so as to function as the anode, i.e., the workpiece is connected to the positive electrode of a source of direct current and the tool is connected to the negative electrode to form the cathode. If, as is the usual practice, the working gap between the workpiece and the tool is filled with an electrolyte, such as a solution of brine, a direct current of considerable magnitude will flow through the gap, removing material from the anode. This source of direct current usually includes a transformer whose output is rectified and applied across the working gap.

In order to progressively remove material from the workpiece at an even rate, a narrow-working gap of a substantially constant prescribed width must be maintained. Usually this is accomplished by feeding the tool electrode toward the workpiece at a substantially constant speed which depends upon the rate of removal of material from the workpiece. However, if, for example, fresh electrolyte solution fails to be supplied to the working gap in sufficient quantity or a number of very fine particles become lodged in the gap, the normal process of removal is impeded, and since the tool continues to feed toward the workpiece at the same constant rate, a short circuit may result when the gap becomes too narrow. Such an occurrence can severely damage either or both the workpiece and the tool unless steps are taken to ensure that the voltage across the gap is cut off immediately and the current is shunted away from the working gap.

One way to protect the tool electrode is to simply connect thyristors across the working gap so that, shortly before or after the occurrence of a short, the thyristors fire and conduct the current that would otherwise flow through the gap. At the same time the power supply is cut off to remove the voltage across the gap so that the current falls to zero within a given period of time.

The electrical power which is injected into the electrical circuit after a short has occurred must, however, be dissipated, primarily by conversion into heat in the thyristors. The energy that must thus be dissipated and the number of thyristors required to dissipate it depend upon the time interval that elapses between the initiation of the short circuit and the removal of the gap voltage.

Short circuit detecting and disconnecting devices have been developed which reliably cause the power to the gap to be cut off and the thyristors to fire. Such arrangements can respond quickly so that, for example, only about 30 microseconds elapses between the time the short circuit occurs and the time that the voltage across the thyristors collapses. Nevertheless, it has been found that it then takes another 250 microseconds before the current through the working gap drops to zero. It is during this second time period that the current must be deflected away from the working gap and through the shunt provided by the fired thyristors. The above-mentioned times were measured in a circuit in which the working gap during the deflection of the current had an inductance of 1 microhenry, and the working current before the short circuit arose was 1,000 amperes. In apparatus designed for higher permanent loads, and even larger direct currents, the times needed for deflecting the current are considerably longer and, despite a satisfactorily short response to the short circuit and a rapid interruption of the supply, the electrode may still suffer damage, despite the presence of the shunting thyristors.

It is the object of the present invention to provide a method of accelerating the rerouting of the current through a shunt such as a thyristor when a short circuit arises in apparatus for electrochemically machining workpieces of the type comprising a circuit wherein several thyristors are connected in parallel to the working gap and which are fired to form a shunt when the short circuit occurs.

According to the invention of the application, when a short circuit occurs, a countervoltage is induced in each thyristor branch or in the line to the workpiece common to all the thyristors, the countervoltage generating a current that opposes the short-circuit current flowing through the working gap. The invention is preferably carried out using a circuit in which each thyristor branch contains the secondary winding of a transformer of which the primary winding is included in a circuit comprising a thyristor, a diode, a charging capacitor and a source for supplying the charging voltage.

Embodiments of the invention are hereinafter described and illustrated in the accompanying drawings which are diagrams of circuits for the electrochemical removal of material and comprising an arrangement according to the invention for accelerating the deflection of a short-circuit current.

Figure 2:
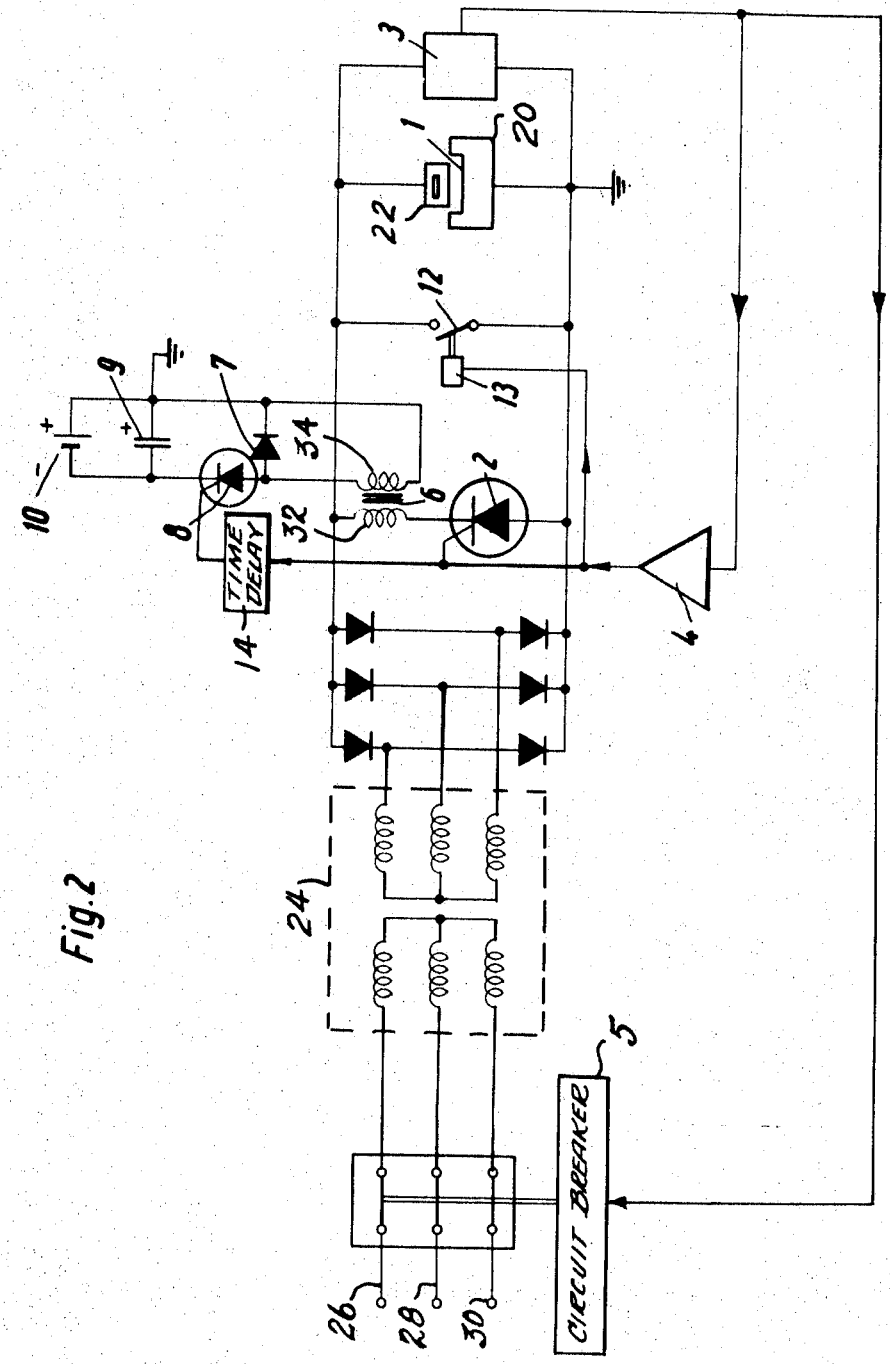

FIG. 1 shows one embodiment of the invention with a transformer linking a capacitor to the thyristor which carries the shunt current; and FIG. 2 shows another embodiment with a mechanical switch also mounted across the gap.

FIG. 1 of the drawings shows the basic circuit of a direct current generator which may be transductor controlled for electrochemical machining and which supplies a working gap 1 between a workpiece 20 and a tool 22. Several thyristors, such a silicon-controlled rectifiers, are preferably connected in parallel to the working gap 1 and all of these thyristors are represented in the drawing by a single thyristor 2. Conventional circuit means 3, which respond to a short circuit, are also provided and the circuit means 3, upon detection of a short circuit, produces an electrical signal which is passed to the thyristor 2 via an amplifier 4 to cause the thyristor 2 to fire. The signal generated by circuit means 3 is also passed to a circuit breaker 5 which responds to the signal by interrupting the flow of current to transformer 24 from the electrical voltage source connected to lines 26, 28 and 30.

Further, thyristor 2 is serially connected to the secondary winding 32 of a transformer 6. A diode 7 is connected across the primary winding 34 of the transformer, and the primary circuit of the transformer also contains a thyristor 8, a capacitor 9 and a source 10 of direct current voltage for charging the capacitor 9.

The illustrated circuit for accelerating the deflection of the current functions as follows. A few microseconds after the thyristor 2 in the shunt has fired in response to a signal from circuit means 3, the thyristor 8 also fires in response to a signal derived from the same circuit means 3 over an appropriate delay circuit 14. The capacitor 9 which has previously charged to the potential of source 10 now discharges through the primary winding 34 of the transformer 6 and induces a voltage pulse in the secondary winding 32. This pulse generates a current pulse which opposes the fading current across the working gap 1. The induced voltage pulse thus forces the short-circuit current to follow the path through the thyristors. Moreover, the induced voltage pulse also improves the reliability of response of the thyristor 2.

The purpose of the diode 7 is to prevent oscillating charging of the capacitor 9. In other words, after discharge of the capacitor 9 the energy stored in the primary winding 34 cannot build up a charge of opposite polarity on the capacitor 9 because diode 7 forms a shunt across capacitor 9.

In order to ensure that the discharge of capacitor 9 is just sufficient to cause the current through the working gap 1 to be forced completely into the shunt thyristor 2 and at the same time to prevent an excessively high capacitor charge generating a current of reverse polarity in the working gap 1, it may be advisable to control the voltage of capacitor 9 by reference to the magnitude of the working current. This could be done in the embodiment of FIG. 1 by automatically raising the charging potential in accordance with the voltage tapped from a supplementary resistor 11.

In further development of the circuit according to the invention as shown in FIG. 2, an additional mechanical short-circuiting switch 12 associated with a high-speed trip 13 is provided. This mechanical trip 13 is likewise shunted across the working gap 1 and the thyristor shunt 2, and its purpose is to prevent a renewed current rise in the working gap, which may occur when there is metal-to-metal contact between the workpiece 20 and the tool 22 and also the voltage drop in the thyristor shunt is too precipitous. The mechanical short-circuiting switch 12 is operated by a pulse from the amplifier 4 at the same time as the thyristors 2 and 8 are fired. Owing to the inertia of the switching elements the mechanical switch does not close until the current in the working gap has fallen to zero, but it nevertheless closes before the current rises again due to the voltage drop across the thyristor 2. This rising current will then flow through the mechanical switch 12 and the working gap 1 will remain substantially without current.

Preferably the mechanical short-circuiting switch is operated by a conventional high-speed trip 13 in which the magnetic forces between two disc windings of a transformer arrangement are utilized. A transformer is discharged through the primary winding whereas the short-circuited secondary winding (usually comprising only 1 turn) is connected to the switching member and actuates the same. Owing to the small switch deflections that can be provided these conventional arrangements respond within times which in order of magnitude are only about 200 microseconds.

Many changes and modifications in the above described embodiment are obviously within the abilities of those of ordinary skill in the art. Accordingly, the scope of the invention is intended to be limited only by the scope of the appended claims.

What is claimed:

1. Apparatus for electrochemically machining comprising:
   means for establishing a working gap
   means for detecting a short circuit across said gap,
   shunt means electrically connected in parallel with said gap for diverting current from said gap when a short circuit is detected, and
   means for accelerating the diversion of current from said gap when a short circuit is detected including means for producing in said shunt means an electrical pulse of such direction that it produces in said gap a current pulse opposing the fading short-circuit current.

2. Apparatus as in claim 1 wherein said shunt means includes first electrical switch means having a high-resistance state and a low-resistance state and which is switched from said high-resistance to said low-resistance state when said detecting means detects a short circuit and wherein said producing means includes a capacitor, means to charge said capacitor, second electrical switch means having a high-resistance state and a low-resistance state and which is switched from said high-resistance state to said low-resistance state when said detecting means detects a short circuit, and a transformer having its primary winding connected to said capacitor so that said capacitor discharges through said primary winding when said second switch means is switched to said low-resistance state and having its secondary winding connected to said first electrical switch means so that when said short circuit is detected a voltage is induced in said secondary winding which produces a current in said gap opposing the short-circuit current.

3. Apparatus as in claim 2 wherein said first and second switches are thyristors.

4. Apparatus as in claim 2 wherein said producing means further includes a diode connected in parallel with said capacitor.

5. Apparatus as in claim 1 further including circuit breaker means for interrupting the flow of current to said gap when said short circuit is detected.

6. Apparatus as in claim 1 further including mechanical switch means connected across said gap for providing an electrical shunt when said short circuit is detected.

7. A method of accelerating the deflection of current flowing in a working gap for electrochemical machining from said gap into shunt means connected in parallel with said gap, having a high and a low-resistance state and assuming said low-resistance state when a short circuit is detected comprising the steps of:
   detecting a short circuit across said gap, and
   producing in said shunt means an electrical pulse of such direction that it produces in said gap a current pulse opposing the fading short-circuit current.

8. A method as in claim 7 wherein said step of producing includes the step of discharging a capacitor through the primary winding of a transformer having its secondary winding connected to said shunt means so that a voltage is induced in said secondary winding which produces a current in said gap opposing the short-circuit current.

9. A circuit for accelerating, upon the occurrence of a short circuit, the deflection of current from a working gap for electrochemical machining into shunt means connected to said gap, having a high and low-resistance state and adapted to assume said low-resistance state upon occurrence of a short circuit comprising:
   a capacitor,
   means to charge said capacitor,
   transformer means having a first winding connected to said capacitor so that, when discharging, said capacitor discharges at least in part through said first winding and having a second winding connected to said shunt means so that said shunt means and said second winding are connected in series and together are connected in parallel with said gap, and
   switch means for permitting said capacitor to discharge at least in part through said first winding when a short circuit occurs so that a voltage in induced in said second winding which produces a current in said gap opposing the short-circuit current.

10. A circuit as in claim 9 wherein said shunt means and said switch means are both thyristors.

11. A circuit as in claim 9 further including a diode connected in parallel with said capacitor.